(12) United States Patent
Ji et al.

(10) Patent No.: US 7,160,025 B2
(45) Date of Patent: Jan. 9, 2007

(54) MICROMIXER APPARATUS AND METHODS OF USING SAME

(75) Inventors: Hongmiao Ji, Singapore (SG); Victor Samper, Springdale (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 67 days.

(21) Appl. No.: 10/459,200

(22) Filed: Jun. 11, 2003

(65) Prior Publication Data
US 2004/0252584 A1    Dec. 16, 2004

(51) Int. Cl.
*B01F 5/00*    (2006.01)
*B81B 1/00*    (2006.01)

(52) U.S. Cl. .................. 366/341; 366/DIG. 3
(58) Field of Classification Search ................ 366/341, 366/DIG. 1, DIG. 2, DIG. 3, 338, 339; 422/100, 422/99
See application file for complete search history.

(56) References Cited

U.S. PATENT DOCUMENTS

| | | | | |
|---|---|---|---|---|
| 4,422,773 A | * | 12/1983 | Cassaday et al. | 366/341 |
| 5,842,787 A | * | 12/1998 | Kopf-Sill et al. | 366/340 |
| 6,170,981 B1 | | 1/2001 | Regnier et al. | 366/336 |
| 6,176,991 B1 | * | 1/2001 | Nordman | 204/601 |
| 6,241,379 B1 | | 6/2001 | Larsen | 366/181.5 |
| 6,270,641 B1 | * | 8/2001 | Griffiths et al. | 204/451 |
| 6,331,073 B1 | | 12/2001 | Chung | 366/341 |
| 6,627,076 B1 | * | 9/2003 | Griffiths | 210/198.2 |
| 6,655,829 B1 | * | 12/2003 | Vanden Bussche et al. | 366/165.1 |
| 2002/0097632 A1 | | 7/2002 | Kellogg et al. | 366/220 |
| 2002/0097633 A1 | | 7/2002 | O'Connor et al. | 366/336 |
| 2002/0125134 A1 | | 9/2002 | Santiago et al. | 204/450 |
| 2003/0070833 A1 | * | 4/2003 | Barth et al. | 174/250 |
| 2003/0075491 A1 | * | 4/2003 | Griffiths | 210/198.2 |
| 2003/0123322 A1 | * | 7/2003 | Chung et al. | 366/165.1 |
| 2004/0047767 A1 | * | 3/2004 | Bergman et al. | 422/99 |
| 2004/0126254 A1 | * | 7/2004 | Chen et al. | 417/423.1 |

FOREIGN PATENT DOCUMENTS

WO    WO 01/89675    11/2001

* cited by examiner

*Primary Examiner*—Tony G. Soohoo
(74) *Attorney, Agent, or Firm*—Winstead Sechrest & Minick P.C.; Kelly K. Kordzik; Edward T. Mickelson

(57) ABSTRACT

Microfluidics mixing apparatus and methods of using same are disclosed for mixing fluids using increasing centrifugal force as the fluids being mixed traverse a mixing channel. One inventive apparatus comprises a generally planar substrate having a top major surface and a bottom major surface generally parallel to the top major surface, and a cover plate over the top major surface. The substrate has at least one inlet port that routes fluid to the top major surface, and at least one outlet port for mixed fluid. The substrate comprises a mixing channel having a depth measured from the top surface and a width, the mixing channel adapted to route fluids to be mixed therein in laminar flow and in a substantially spiral flow pattern that is parallel to the top surface. Apparatus of the invention can mix fluids flowing serially, or two or more fluids entering the device from different feed channels.

2 Claims, 3 Drawing Sheets

MICROMIXER APPARATUS AND METHODS OF USING SAME

BACKGROUND INFORMATION

1. Technical Field

The present invention relates generally to fluid dynamics. More specifically, the invention relates to apparatus for mixing fluids, and methods of making and using such apparatus.

2. Background Art

A micromixer is a device used to mix small volumes of fluids flowing in very narrow channels. A micromixer is essential in many of the microfluidics systems targeted for use in biochemical analysis, drug delivery, and sequencing or synthesis of nucleic acids. Biological processes such as cell activation, enzyme reactions, and protein folding often involve reactions that require mixing of reactants for initiation. Mixing is also necessary in many microfabricated chemical systems that carry out complex chemical synthesis. See "Passive Mixing in a Three-Dimensional Serpentine Microchannel," R. H. Liu, M. A. Stremler, K. V. Sharp, M. G. Olsen, J. G. Santiago, R. J. Adrain, H. Aref, and D. J. Beebe, *Journal of Microelectromechanical Systems*, Vol. 9, No. 2, June 2000.

When fluids flow in channels approximately the size of a human hair, the phenomenon, known as laminar flow, exhibits very different properties than fluids flowing within the macro world. Laminar flow, also associated with low Reynolds numbers, will allow the movement of different layers of the fluid and particles next to each other in a channel with little or no mixing, except for diffusion.

As explained by Liu et al., using a classification that is adapted here, micromixers can be classified as either active or passive. Passive stirring schemes include simple in-plane lamination and chaotic advection stirring (defined by Liu et al. as the rapid distortion and elongation of material interfaces). Active mixers have moving parts or externally applied forcing functions such as pressure, electric field, or ultrasound. Passive mixers typically use channel geometry to increase the interfacial area between the liquids to be mixed, thus improving the odds for diffusional mixing. These mixers can be categorized into two subclasses: in-plane mixers, which divide and mix streams within a fluid network confined to one level, and out-of-plane or lamination mixers, which use three-dimensional channel geometries. The above-referenced Liu et al. article describes a three-dimensional serpentine channel out-of-plane passive mixer, which relies on chaotic advection, as well as two in-plane mixers: square-wave channel, and straight channel. The simplest in-plane mixers merge two fluid streams into a single channel and accomplish mixing by molecular diffusion, relying on time and high diffusion coefficients to mix the fluids or move solutes between fluids. This is troublesome for biologic samples, whose constituent molecules are frequently complex oligomeric or polymeric structures. Out-of-plane, lamination mixers sequentially split and stack fluid streams in a three-dimensional fluidic network. Lamination mixers typically require multi-layer microfabrication techniques, which make them less attractive to bioanalysis system designers where targets are simple fabrication, planar designs, and ease of integration into microfluidic systems.

Several other microfluidic devices have been developed recently which attempt to improve fluid mixing within microscale devices. U.S. Pat. No. 6,136,272, which issued on Oct. 24, 2000, and is assigned to the University of Washington, describes a device for rapidly joining and splitting fluid layers within microfluidic channels which allow for diffusional mixing in two directions, in the depth direction and in the width direction. Unfortunately, the devices described in this patent, which refer to curved bridge channels used in "mixing mode," do not describe centrifugal mixing in these channels, and in fact appear to be devoted to keeping the laminar flow streams separated in the bridge channels. The only mixing occurring in these devices appears to be in parallel, straight channels downstream from any curved bridge channel.

Patent Cooperation Treaty WO 01/89675 A2, published Nov. 29, 2001 and assigned to Micronics, Inc., describes a jet vortex mixer, generally circular-shaped, containing no moving parts, and capable of mixing both serial and laminar flow streams. This device may be termed an active mixer, in that the inlets of this device are connected with pumping valves that provide the power to the mixer and transport fluids forward and backward inside the mixer. The device requires converging sections for the fluid entering the device, thereby increasing linear velocity of the fluid prior to entering the mixing chamber. These converging sections may lead to difficulties in cleaning the device for repeated use.

U.S. Published Patent Application No. 2002/0097632 A1, published Jul. 25, 2002, describes microsystem platforms for achieving efficient mixing of one or a plurality of fluids on the surface of the platform when fluid flow is motivated by centripetal force produced by rotation, similar to a CD-ROM disc. These devices appear to be able to mix fluids only in serial fashion, not in laminar layers.

Despite recent advances, there is an unmet need in many arts for efficient, reliable, and repeatable mixing of reagents or reagents and samples in microfluidic devices. For example, biochemical analysis, drug delivery, sequencing or synthesis of nucleic acids, biological processes such as cell activation, enzyme reactions, and protein folding often involve reactions that require mixing of reactants in microspace for initiation. Mixing is also necessary in many microfabricated chemical systems that carry out complex chemical synthesis, such as combinatorial chemistry.

SUMMARY OF THE INVENTION

The apparatus and methods of the present invention reduce or overcome many of the noted problems of previous microfluidics apparatus and methods.

A first embodiment of the invention are microfluidics mixing apparatus for mixing at least two fluids, one inventive apparatus comprising a substrate comprising one or more fluid inlet conduits and a mixing channel, the mixing channel having a depth and a width, the mixing channel adapted to route fluids to be mixed therein in a substantially spiral flow pattern that is substantially parallel to a top surface of the substrate, the mixing channel connected to a product conduit.

Apparatus of the invention may comprise a generally planar substrate having a top major surface and a bottom major surface generally parallel to the top major surface. The substrate may have one or more inlet ports that route fluids to be mixed to the top major surface. For example, apparatus of the invention could mix two or more fluids entering through the same inlet port but at different times. The substrate may also have an outlet port for mixed fluid, if necessary, in accordance with the specific use of the apparatus. More commonly, apparatus of the invention will mix two or more fluids flowing from different feed streams, and if inlet ports are necessary, the apparatus will comprise first and second inlet ports, the first inlet port connected to the feed conduit, and the second inlet port connected to a second feed conduit, the first a second feed conduits meeting at a mixing point in the mixing channel. At least one of the feed conduits to the mixing channel is tangent to the substantially spiral flow pattern. The mixing channel may comprise first and second mixing channel sections, the first mixing channel section adapted to route the fluids to be mixed from a periphery of the substrate to a center of the substrate. Thereafter, the first mixing channel section feeds the second mixing channel section, wherein the fluids being mixed flow in a reverse spiral pattern compared to the spiral pattern of the first mixing channel section. The second mixing channel section may or may not be adjacent the first mixing channel section. The outlet port may be centered in the substrate, or located on the periphery of the substrate. The outlet port may connect to a second fluid handling device, wherein the second fluid handling device is a second apparatus of the invention or a different device. The apparatus may include a cover plate, which may be transparent allowing optical access. Alternatively, the mixing channel may be closed by growing up the edges of the channel, or the mixing fluids may form a solidified top surface, while the bulk of the mixing fluids traverse the mixing channel beneath the solidified top surface. The mixing channel has a cross-section shape selected from the group consisting of rectangular, circular, oval, and trapezoidal.

The mixing channel may be comprised of a reactive material or an inert material. Reactive materials may be either organic or inorganic, and selected from the group consisting of catalysts, enzymes, ligands, oligomers, oligonucleotides, and the like. The substrate comprises materials selected from the group consisting of silicon, metal, glass, ceramic, and combinations thereof. The inlet port and the outlet port may open to the top surface or to the peripheral edge of the substrate to another in-plane device.

Another embodiment of the invention are methods of mixing fluids using the mixing apparatus of the invention, the method comprising the steps of:
a) selecting fluids to be mixed;
b) selecting a radius R of the apparatus and a depth and a width of the mixing channel according to the principles:
  i) dead volume is low as possible;
  ii) flow rate of mixed fluid;
  iii) viscosity of mixed fluid;
  iv) $0 < t_r < t_c$,
where $t_r$ is residence time of fluids flowing in the mixing channel, and $t_c$ is time required for complete mixing of fluids in an ideal mixer; and
c) applying fluids to be mixed and flowing the fluids through the mixing channel.

The methods of using the apparatus may include the step of selecting an angle θ between two feed conduits; maintaining temperature of the fluids being mixed; and removing heat energy generated during mixing or adding heat energy to the apparatus during mixing. The methods may also include monitoring extent of mixing and/or an extent of reaction by measuring a property of the mixed fluid selected from the group consisting of color, temperature, change in temperature from one point to another point in the mixing channel, radioactivity, binding affinity, NMR spectra, mass spectra, IR spectra, X-ray fluorescence spectra, Raman spectra, conductivity, resistivity, zeta potential, surface plasmon resonance, viscosity, index of refraction, fluorescence, viscosity, index of refraction, pH, and combinations of the foregoing.

Further aspects and advantages of the invention will become apparent by reviewing the description of embodiments that follows.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The inventors have developed unique apparatus and methods of using same to mix fluids. Apparatus and methods of use of the invention rely on mixing resulting from a centrifugally enhanced diffusion process. The non-uniform velocity profile across the section of the mixer arises from the combination of viscous forces and centrifugal (inertial in the radial direction) forces. The viscous forces give rise to the typical quadratic velocity profile whilst the centrifugal forces are proportional to the tangential velocity, the fluid mass, and the radius of the mixing channel from the center of the apparatus to the point of interest. The solution of all forces on the liquid results in a flow pattern that continuously circulates the liquid from an inner inlet channel into the fluid entering a second, or outer channel. Depending on the size of the apparatus and the intent of the user, more than one fluid can be mixed in apparatus of the invention.

Figure 1:
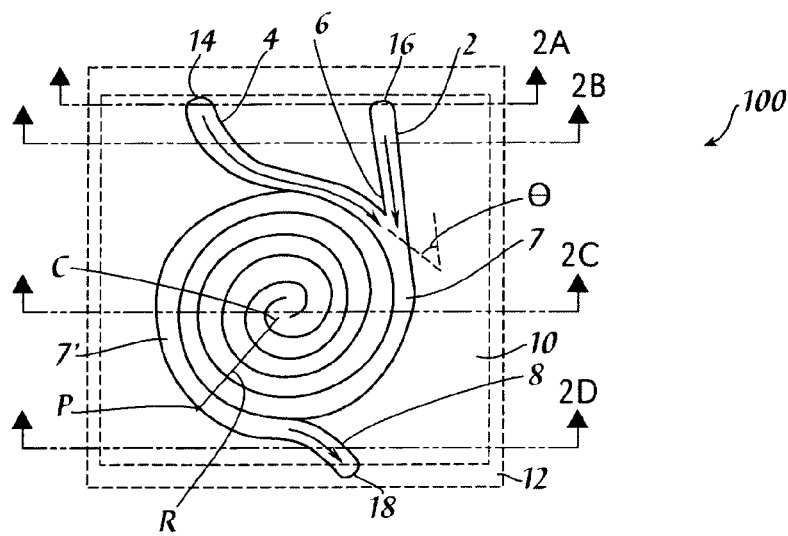
FIG. 1 is a schematic plan view (enlarged) of an apparatus of the invention, with some components illustrated in phantom.
Figure 2A:
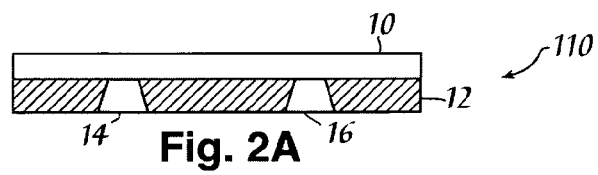
FIGS. 2A, 2B, 2C, and 2D are cross-sections (enlarged) taken along the lines indicated in FIG. 1.
Figure 2B:
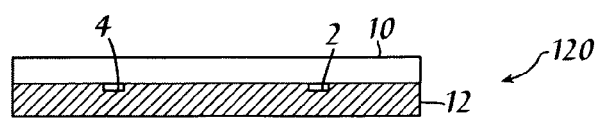
Figure 2C:
Figure 2D:
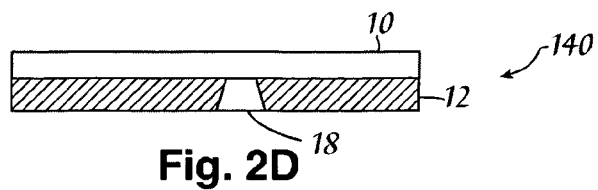

Referring now to the drawing figures, FIG. 1 is a schematic plan view (enlarged) of an apparatus 100 of the invention, with some components illustrated in phantom. Apparatus 100 has a first fluid feed conduit 2, a second fluid feed conduit 4, and a mixing point 6. First and second feed conduits 2 and 4 form an angle θ, which ranges from about 10 to about 90 degrees, more preferably from about 20 to about 45 degrees. First and second feed conduits feed a mixing channel 7, which winds in a spiral toward a center point C of the apparatus. After reaching center point C, in this embodiment fluids being mixed continue in a second mixing channel 7', which lies adjacent mixing channel 7, and the fluids being mixed flow in the opposite angular direction compared to the fluids traversing channel 7. Apparatus 100 also has inlet ports 14 and 16, and a product conduit 8 leading to an outlet port 18. A cover plate 10 and substrate 12 are illustrated in phantom. Also illustrated is a radius R, measured along the line C–P, where P is a point on the periphery of the substrate. It should be mentioned that the radius R of apparatus of the invention is continually changing as the point P moves around the periphery of the substrate.

In general, the following principles are abided by in the methods and apparatus of the invention in selecting a radius R of the apparatus and a cross-sectional area A and width of the mixing channel:

i) dead volume is low as possible;
ii) flow rate of mixed fluid;
iii) viscosity of mixed fluid; and
iv) $0 < t_r < t_c$, where $t_r$ is residence time of fluids flowing in the mixing channel, and $t_c$ is time required for complete mixing of fluids in an ideal or perfect mixer.

FIGS. 2A, 2B, 2C, and 2D are cross-sections (enlarged) taken along the lines 2A, 2B, 2C, and 2D, respectively, and designated 110, 120, 130, and 140. Cross-section 110 (FIG. 2A) indicates where in embodiment 100 the inlet and outlet ports 14 and 16 are positioned, as well as feed conduits 2 and 4. Cross-section 120 (FIG. 2B) indicates the position of feed conduits 2 and 4. Cross-section 130 (FIG. 2C) indicates first and second mixing channels, 7 and 7'. Finally, cross-section 140 (FIG. 2D) indicates the position of outlet port 18.

Figure 3:
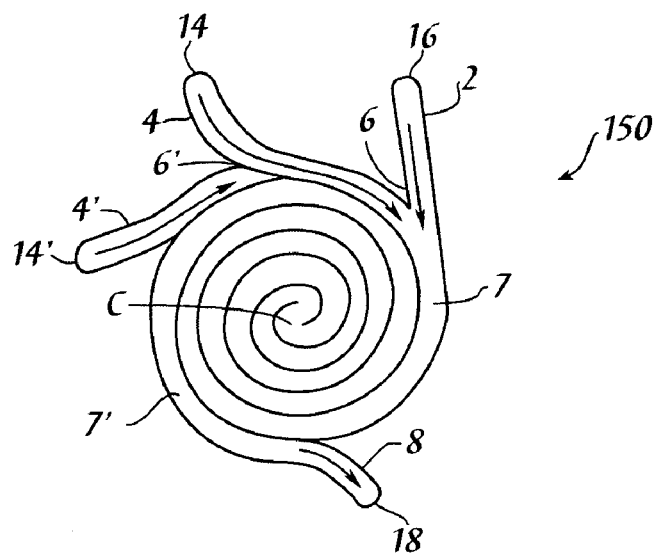
FIG. 3 is a schematic plan view (enlarged) of another apparatus of the invention.

FIG. 3 is a schematic plan view (enlarged) of another apparatus of the invention, embodiment 150. Embodiment 150 is similar to embodiment 100 of FIG. 1, but includes a third inlet port 14' and third feed conduit 4', which connect with second feed conduit 4 at a junction 6'. More than three fluids may be mixed in a given apparatus embodiment, as long as appropriate inlets ports and flow channels are available.

Figure 4:
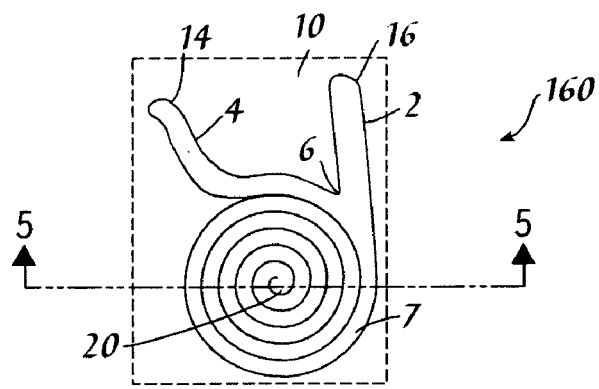
FIG. 4 is a schematic plan view (enlarged) of another apparatus of the invention.

FIG. 4 is a schematic plan view (enlarged) of another apparatus of the invention, embodiment 160. Embodiment 160 allows mixing of two fluids through inlet ports 14 and 16 and feed conduits 2 and 4, however, this embodiment is not limited to mixing of two fluids, and can be adapted to mixing three fluids, as depicted in FIG. 3. In embodiment 160 of FIG. 4, two fluids meet at junction 6, and flow in a single mixing channel 7 toward and eventually into an outlet 20 positioned in the center of the device.

Figure 5:
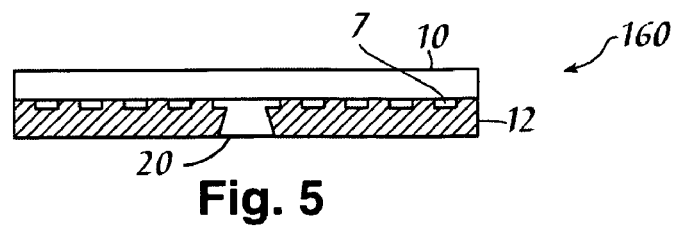
FIG. 5 is a cross-section taken along the section 5—5 of FIG. 4.

FIG. 5 is a cross-section taken along the section 5—5 of FIG. 4, further illustrating outlet port 20 and mixing channel 7.

Figure 6A:
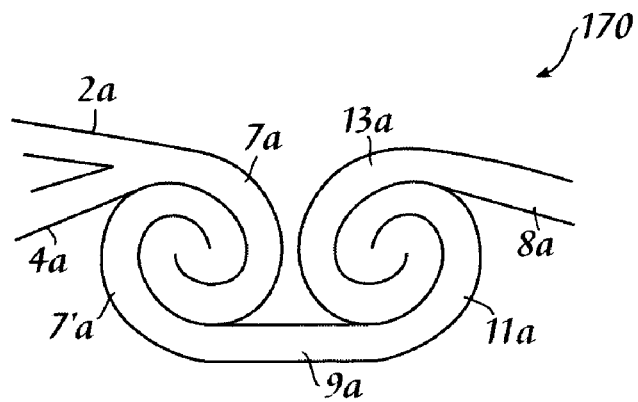
FIGS. 6A–C are schematic plan views (enlarged) of three apparatus of the invention.
Figure 6B:
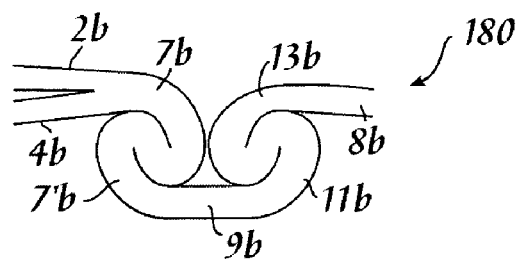
Figure 6C:
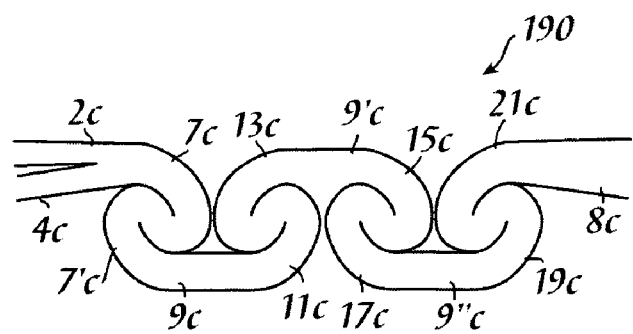

FIGS. 6A–C are schematic plan views (enlarged) of three apparatus of the invention. FIG. 6A illustrates an embodiment 170 having two centers as opposed to one center as in FIGS. 1–5. Fluid inlet conduits 2a and 4a direct two fluids to be mixed to a first mixing channel 7a, then to a second mixing channel 7a'. Mixing continues in mixing channel 9a, which also function as a connection to the second stage and mixing channels 11a and 13a. Mixed fluid exits the apparatus through outlet channel 8a. FIG. 6B illustrates an embodiment 180 similar to embodiment 170 of FIG. 6A. Two fluids to be mixed enter through fluid inlet conduits 2b and 4b, which direct the fluids to mixing channels 7b and 7b', then mixing channels 9b, 11b, and 13b, and finally the mixed fluid exits through outlet channel 8b. Embodiments 170 and 180 differ essentially in that embodiment 170 has longer channels, and thus the mixing fluids experience longer residence time ($t_r$). FIG. 6C illustrates an embodiment 190 having four centers, which may be viewed as two apparatus of embodiment 180 connected in series. Two fluids to be mixed enter through fluid inlet conduits 2c and 4c, which direct the fluids to mixing channels 7c and 7c', then mixing channels 9c, 11c, and 13c. A connecting channel 9c' connects mixing channel 13c with mixing channel 15c, which in turn routes mixing fluids through channels 17c, 9c", 19c, 21c, and finally the mixed fluid exits through outlet channel 8c. In each embodiment 170, 180, and 190, the length of the mixing chambers (number of the circles) can be more or less, depending on mixing efficiency.

The apparatus and methods of the invention can accommodate many variations, including but not limited to mixing non-reactive fluids, mixing one reactive fluid with one inert fluid, mixing cold fluids with hot fluids, as long as the materials of construction used are sufficient to withstand at least one such mixing use. Parallel and series versions of the embodiments of FIGS. 1, 3, and 4 are possible, for example where two fluids are mixed in a first apparatus, then the mixture mixed with a third fluid in a second apparatus, where the second apparatus is the same or different from the first. Embodiments may be envisioned wherein the mixing channel comprises reactive sites, or reactive moieties, receptors, and the like, and the apparatus used as a filter or chromatograph.

The substrate material may be any material that can be shaped or formed into a planar shape and have channels formed therein or thereon. The mixer can be fabricated on or from any substrate suitable for the fluids of interest. The spiral mixing channels are typically in the range of 20–200 µm wide and 20–200 µm deep. The profile of the channels can be rectangular, trapezoidal, circular, oval, or any other shape that can be patterned on the substrate. The substrate may be silicon and the cover plate may be glass or plastic. The two materials can be bonded together with anodic binding with silicon and glass. Inlet ports and outlet ports of the mixer can be in-plane or out-of-plane. The out-of-plane embodiment is illustrated in FIG. 1. The access holes are illustrated in the silicon substrate that contains the spiral channel, however, apparatus of the invention have also been shown to function equally well for holes drilled in the cover material. The fluid inlet and outlet ports can also lead to the edge of the substrate for edge type connections. The apparatus of the invention may employ any other materials including, but not limited to, polymer substrates such as polyester, for example polycarbonate, or polydimethylsulphoxane (PDMS), metallic substrates such as aluminum, stainless steel, or titanium, glass substrates such as borosilicate glass, and ceramic substrates. Likewise the cover layer is illustrated for glass, but can be any other material suitable for sealing the channels. The apparatus embodiments illustrated herein depict etched channels produced in the substrate, however apparatus of the invention may also be fabricated by techniques that result in channels on the substrate, such as thin film and thick film surface micromachining including, but not limited to, channels fabricated using electroplated metal walls, polysilicon walls, silicon dioxide walls, or silicon nitride walls.

Polymer inking techniques, as taught in copending application Ser. No. 10/444,505, filed May 23, 2003, incorporated herein by reference, may be used to form mixing channels, depending on the properties of the fluids to be mixed. In polymer inking processes, a polymer, such as a polymer film, is applied, possibly spin coated, onto a patterned mold, and ultimately transferred to a substrate and a positive image of the pattern is obtained. Selective surface treatments (also referred to sometimes as differential surface energy treatments) have been developed with a goal being to improve the edge smoothness of the "inked" pattern. During selective surface treatment, protruded surfaces of the transfer member (referred to herein as protrusions) are first treated, such as with a flexible stamp (also referred to herein as an applicator) impregnated or simply coated with a silane to produce a medium energy surface on the protrusions. The transfer member is then exposed to a second surface energy modifier, such as with immersion in a liquid organosilane, to treat the recesses or trenches of the transfer member and produce a surface energy lower than the first treatment. Because the surface energy of the sidewalls and bottoms of the recesses is lower than that of the protrusions, polymer dewetting from the sidewalls is promoted. Dewetting from the sidewalls causes the polymer to become discontinuous near the protrusion edges (also referred to herein as feature edges). Therefore, the polymer on the protrusion surface of the transfer member can be inked to the substrate with smooth edges. Other high throughput patterning techniques, such as microcontact printing (µCP) and nanoimprint lithography (NIL) may also be employed.

FIGS. 1 and 2 illustrate plan view and cross section schematic views of an apparatus 100 of the invention designed with dual helical passages, spiraling inwards to the center and back out to the perimeter. In this embodiment, the device is formed in substrate 12 and covered by a glass wafer 10. Cover 10 is transparent to allow optical access to the channels 2, 4, and 7. Backside openings form the inlets 14 and 16 and outlet 18. In embodiment 100 of FIG. 1, feed channel 2 joins with feed channel 4 to form a junction 6. Feed channel 2 is tangent to the outer periphery of the apparatus. Mixed fluid conduit 8, termed herein the mixer end, can be connected to another microfluidic components such as reaction chambers, binding chambers, liquid reservoirs, or other in plane microfluidic channels (not shown). It also can connect to outlet port 18 to withdraw fluids from the microdevice of the invention.

The circulation flow of apparatus of the invention increases the effective contact area between fluids of interest for mixing and therefore enhances the process of mixing by diffusion. It can be shown that increasing the flow velocity enhances the circulatory flow however it reduces the overall time the fluids are resident in the mixer and therefore suffers from reduced time for diffusion. For example, slow liquid velocities suffer from poor circulatory flow although the resident time in the mixer is large. In such cases the spiral geometry has little enhancement on the process of diffusion based mixing.

Apparatus of the invention are suitable for asymmetric flow rates through the inlet ports and feed channels. They can also be used with fluids of the same or different mass densities. The spiral geometry increases the centrifugal component of force as the fluid travels towards the mixer center. At the outer radius the centrifugal force is at its minimum. The optimum mixer design balances the parameters of dead volume and residence time given the range of fluid velocities. Increasing the overall radius of the mixer increases the dead volume and has an ever-decreasing enhancement by centrifugal forces, however it is often necessary to provide sufficient residence time for fluid mixing as the fluid velocity increases. In such cases the advantage of the inventive mixers' compact form can also be seen.

The extent of mixing may be observed, monitored, controlled and/or maintained by any number of analytical techniques, including but not limited to: measuring a property of the mixed fluid selected from the group consisting of color, temperature, change in temperature from one point to another point in the mixing channel, radioactivity, binding affinity, NMR spectra, mass spectra, IR spectra, X-ray fluorescence spectra, Raman spectra, conductivity, resistivity, zeta potential, surface plasmon resonance, viscosity, index of refraction, fluorescence, viscosity, index of refraction, pH, and combination of the foregoing.

Although the foregoing examples and description are intended to be representative of the invention, they are not intended to in any way limit the scope of the appended claims.

What is claimed is:

1. An apparatus for mixing at least two fluids comprising a substrate including one or more fluid feed conduits for routing two or more fluids to be mixed to a mixing channel, the mixing channel having a depth and a width, the mixing channel adapted to route fluids to be mixed therein in a substantially spiral flow pattern that is substantially parallel to a top surface of the substrate, the mixing channel connected to a product conduit, wherein the mixing channel comprises first and second mixing channel sections, the first mixing channel section adapted to route the fluids to be mixed from a periphery of the substrate to a center of the substrate in said substantially spiral pattern, at which point the first mixing channel section feeds the second mixing channel section, wherein the fluids being mixed flow in a reverse spiral pattern compared to the spiral pattern of the first mixing channel section, the second mixing channel section being adjacent the first mixing channel section.

2. A mixing apparatus comprising a substrate having a mixing channel, the mixing channel comprising first and second mixing channel sections, the first mixing channel section adapted to route two or more fluids to be mixed from a periphery of the substrate to a center of the substrate in a substantially spiral pattern, at which point the first mixing channel section feeds the second mixing channel section, wherein the fluids being mixed flow in a reverse spiral pattern compared to the spiral pattern of the first mixing channel section, the second mixing channel section being adjacent the first mixing channel section.

* * * * *